Patented Sept. 5, 1950

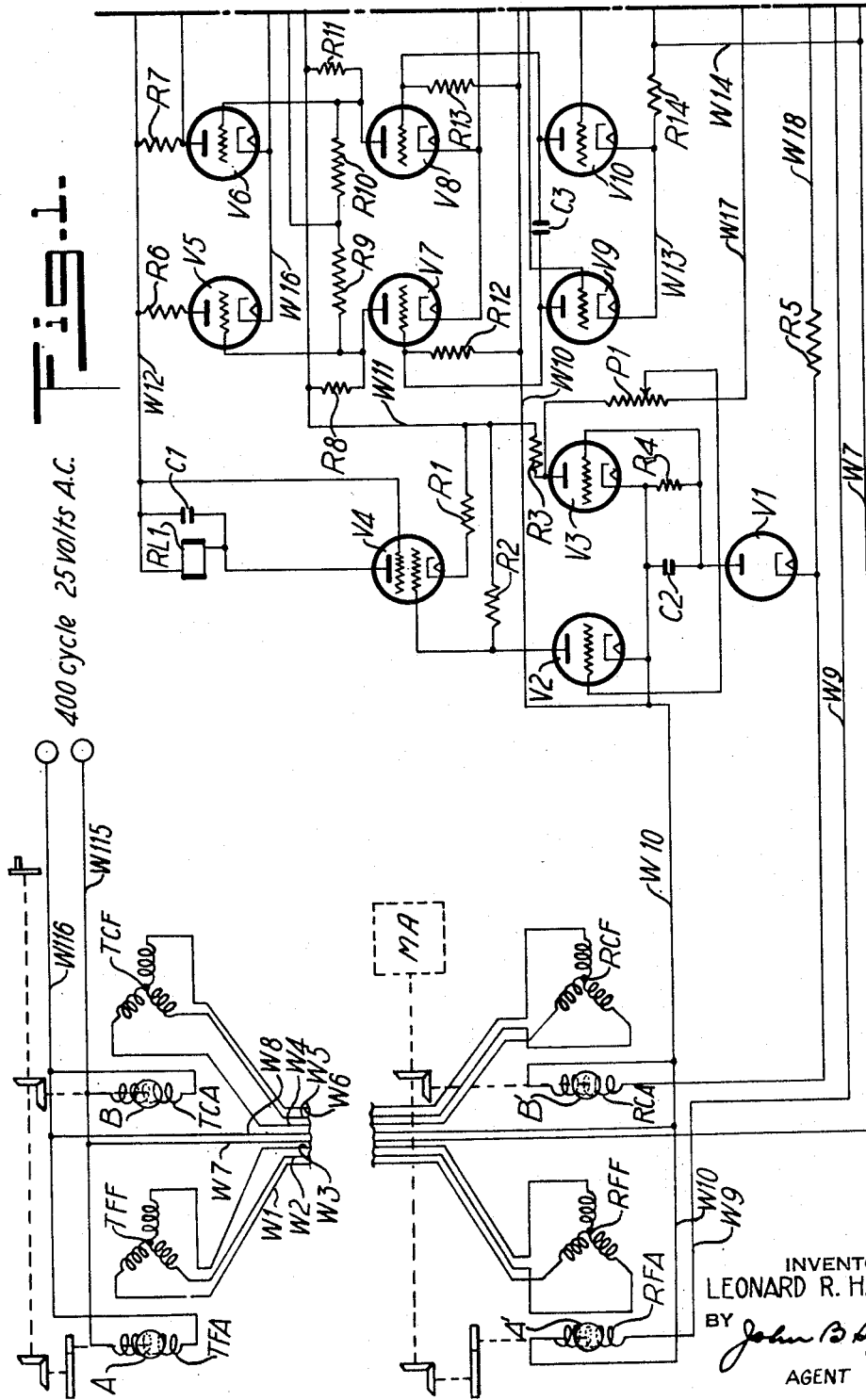

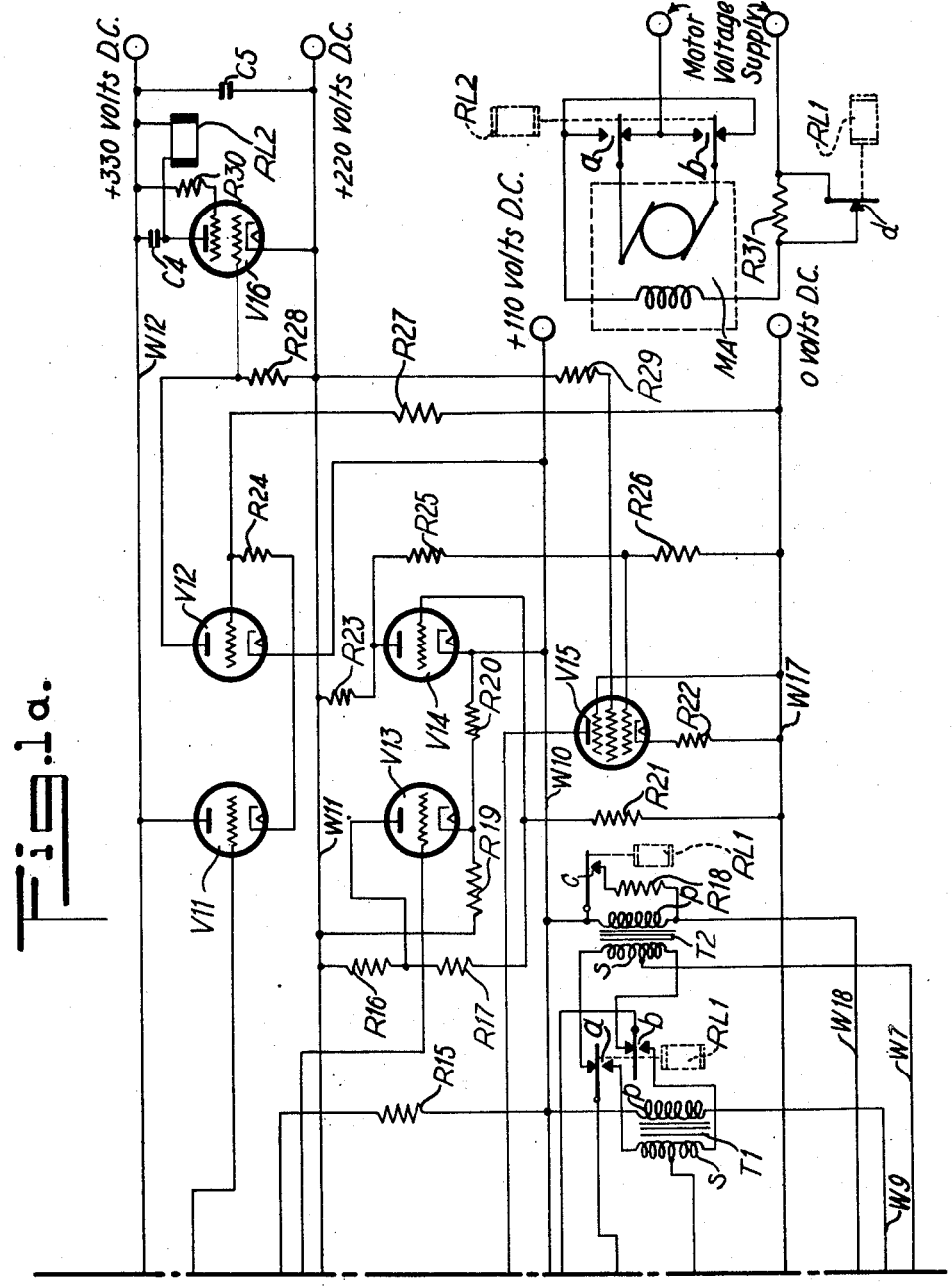

2,521,365

UNITED STATES PATENT OFFICE 2,521,365

POSITIONING DEVICE

Leonard R. Harper, West Hempstead, N. Y., assignor to International Business Machines Corporation, New York, N. Y., a corporation of New York Application June 7, 1948, Serial No. 31,570

8 Claims. (Cl. 318—30)

This invention relates to remote control devices, and in particular to devices of such nature wherein mechanical motion is reproduced accurately at a distant point; for example, the positioning of two rotatable shafts with respect to each other.

A system employing devices of the subject type is shown in U. S. Patent 1,508,796 wherein a series of electro-magnetic relays are utilized to operate contacts for establishing electrical circuits for controlling the rotation of an electric motor. In the present invention an arrangement is provided utilizing electron discharge devices to establish circuits to control the operation of an electric motor taking advantage of the inherent inertialess characteristics of such electronic devices to provide a more accurate and quicker operating remote control system.

Other objects of the invention will be pointed out in the following description and claims and illustrated in the accompanying drawings, which disclose, by way of examples, the principle of the invention and the best mode, which has been contemplated, of applying that principle.

As illustrated in Figs. 1 and 1a of the drawing, the invention is carried out by means of synchronous control transformers or Selsyn transmitting devices similar to those shown in U. S. Patent 1,637,039. Each of these devices has a poly-circuit stator winding and single circuit rotor winding. Now referring to the drawing, a shaft A having a rotor winding TFA cooperating with a stator winding TFF is geared to another shaft B having a rotor winding TCA cooperating with a stator winding TCF. The shaft A may have a gear ratio of 10:1 with respect to shaft B, i. e. ten revolutions of shaft A will produce one revolution of shaft B. An alternating voltage of approximately 400 cycles (25 volts) is impressed across the windings TCA and TFA. At a place remote from the shafts A and B, a second pair of shafts A' and B' are located. The shaft A' is attached to a rotor winding RFA having a cooperating stator winding RFF and geared to the shaft B', which is attached to a rotor winding RCA having a cooperating stator winding RCF. A series motor is provided to have its armature MA geared (gearing not shown) to the shaft A', which has the same gear ratio with respect to shaft B' as shaft A has with respect to shaft B. Corresponding terminals of the stator windings TFF and RFF, and of the stator windings TCF and RCF, are connected together by conductors W—1, W—2, W—3 and W—4, W—5, W—6, respectively.

In the arrangement just described the rotor winding TFA and stator winding TFF associated with shaft A act as a Selsyn transmitter delivering energizing potential via conductors W—1, W—2, W—3 to the stator winding RFF, which, together with the rotor winding RFA, acts as a Selsyn receiver. The voltage induced by the stator winding RFF in the rotor winding RFA when shaft A is revolved to a position not coincident with the position of shaft A' is representative of their angular displacement both in magnitude and direction.

Therefore, at any instant the induced voltage of the rotor winding RFA is indicative of the relative angular displacement of the shafts A and A'. Similarly at any instant the induced voltage of the rotor winding RCA is indicative of the relative angular displacement of the shafts B and B'. In other words, the voltage induced in the rotor winding RFA is a function of the cosine of the angle between the rotors TFA and RFA, and the voltage induced in the rotor winding RCA similarly is a function of the cosine of the angle between the rotors TCA and RCA. It is readily understood that the maximum induced voltage will occur when the aforesaid angle is zero degrees or 180 degrees, i. e. when the cosine of the angle equals unity. Similarly it is obvious that when the aforesaid angle is 90 degrees or 270 degrees, the induced voltage will be zero, i. e. when the cosine of the angle equals zero.

When the voltage is zero a "null point" occurs, i. e. an angular displacement between the rotors in one direction will cause the same induced voltage as an equal angular displacement in the other direction; however, the phase of the voltage in the first instance will be opposite to that of the second instance. It is apparent, therefore, that in order to insure a proper angular alignment of the shaft A' with respect to the alignment of shaft A the difference in angular displacement between the shafts must be less than 180 degrees, i. e. a null point must not be traversed. Such limitation is avoided in the present invention by the use of pairs of geared together Selsyn transmitters and receivers arranged for mutual control of the shaft aligning mechanism. For example, when the angular displacement between the rotors TFA and RFA is less than 180 degrees the aligning means is controlled by the voltage induced in the winding RFA while for greater angles of displacement the aligning means is controlled by the voltage induced in the winding RCA. These induced voltages, or error signals, are such that their amplitudes vary with the amount of displacement and their phase relationship indicates the direction of the displacement.

Referring to the drawing, it is to be noted that D. C. potentials are supplied to the lines W—10, W—11, W—12, and W—17 from a suitable source (not shown). Similarly a potential of approximately 25 volts A. C. is supplied across W—15 and W—16.

Error voltage is fed to the grids of a pair of triodes V—9 and V—10 from the rotor winding RFA so long as the angular displacement between rotor TFA and RFA is less than 180 degrees via a circuit: Winding RFA, line W—9, primary P of transformer T—1, line W—10, to winding RFA. Since the tube V—4 is normally conducting a relay coil RL—1 is energized via a circuit: Cathode of V—4, resistor R—1, line W—11, through D. C. source (not shown) to line W—12, relay RL—1, to anode of V—4. Consequently the relay contacts RL—1a and RL—1b will transfer to allow the secondary S of transformer T—1 to be connected respectively to the grids of V—9 and V—10. Since power to cause these tubes to conduct is derived from the 400 cycle alternating supply source, V—9 and V—10 are capable of conducting only during the negative half of each cycle of the 400 cycle supply, via their common cathode connection W—13, resistor R—14, line W—14, line W—7, line W—15, 400 cycle supply, line W—16, line W—8, line W—10, resistor R—12 to anode of V—9 or resistor R—13 to anode or V—10. Voltage induced in the secondary of T—1 is proportional to the error voltage and is therefore applied to the grids of V—9 and V—10 so that the anode currents of V—9 and V—10 are correspondingly proportional. Consequently the anode potentials of V—9 and V—10 are different and that voltage difference is applied across a capacitor C—3. During the positive half of the cycle of the 400 cycle supply source, tubes V—9 and V—10 cannot conduct so that the condenser C—3 discharges via resistor R—12, line W—10, and resistor R—13, and voltage drops are developed across these resistors respectively for exciting the grids of vacuum tubes V—7 and V—8.

Provision is made respecting the tubes V—7 and V—8 so that when the grids of those devices are driven negative the cathodes will be proportionally lowered in potential to maintain a constant total current by stabilizing the mean plate voltage of the tubes V—7 and V—8. A stabilizing network comprises the vacuum tubes V—13, V—14, and V—15. The cathode of tube V—13 is maintained at a predetermined value by a voltage divider composed of the resistors R—19 and R—20 across the lines W—10 and W—11. The grid of tube V—13 is fed from a center tap between a pair of resistors R—9 and R—10 connected across the anodes of the tubes V—7 and V—8, which are in turn connected to the line W—11 by the resistors R—8 and R—11, respectively. Consequently a change of the mean anode voltage of tubes V—7 and V—8 will be applied to the grid of tube V—13, the output of which is coupled to the grid of tube V—14 by the resistor network composed of resistors R—16, R—17, and R—21 across the D. C. supply lines W—11 and W—17. Amplification takes place in tube V—14 in conventional manner to apply potential to the grid of the tube V—15 via the resistor network, resistors R—23, R—25, and R—26, so that the anode current of V—15 tends to regulate the potential of the cathodes of the tubes V—7 and V—8 since their cathode circuit includes the anode-cathode path of tube V—15 and the resistor R—22. In other words any change of mean anode potential of the tubes V—7 and V—8 will cause a corresponding counteracting change upon the voltage level of the cathodes of the tubes V—7 and V—8 via the action of the tubes V—13, V—14, and V—15 just described. The effect of this counteraction serves the dual purpose of allowing the grids of the triodes V—7 and V—8 to be driven negative without affecting the mean plate voltage or total anode current of tubes V—7 and V—8 and of reducing the time response constant of their control circuits.

The grids of the vacuum tubes V—5 and V—6 are energized respectively by voltage drops set up in the resistors R—8 and R—11 arising from anode currents of V—7 and V—8, thereby causing anode current in V—5 or in V—6 to flow via line W—12; resistor R—6, anode of V—5, cathode of V—5, or resistor R—7, anode of V—6, cathode of V—6; line W—16, resistor R—15, to line W—10. Due to the common cathode return of V—5 and V—6, i. e. line W—16 and resistor R—15, when anode current of V—7 is higher than that of V—8 the grid of V—5 is lowered with respect to its cathode so that the tube V—6 provides the current necessary to maintain the common cathode potential and vice versa. When the tube V—6 conducts, however, its anode potential drop is applied to the grid of a tube V—11 acting as a cathode follower. Since the tube V—11 is normally conducting, its anode current is thereby cut off thereby reducing the grid potential of the tube V12, which normally is conducting as a result of the potential drop of the resistor R—27 which, together with resistor R—24, forms the cathode return of the tube V—11. When the grid of V—12 becomes negative its anode current falls off to zero, or to a very low value, and the voltage drop in the resistor R—28, which normally holds the control grid of the tube V—16 negative, diminishes to a value causing the tube V—16 to conduct thereby energizing a relay coil RL—2 via a circuit: Line W12, relay coil RL—2, anode of V—16, cathode of V—16, to line W—11.

The relay contacts RL—2a and RL—2b are transferred by the energization of the relay coil RL—2 to operate the motor MA in either a clockwise or a counterclockwise direction so that the shaft A' is turned until there is no longer an error voltage induced in the winding RFA whereat the rotors RFA and TFA are in angular agreement. The relay RL—2, however, has only two conditions, i. e. either energized or deenergized, so that the motor MA constantly turns the shaft A' first in one direction and then in the other direction oscillating about the point of angular agreement of the two shafts A and A' until a further displacement of the shaft A is made producing an error voltage in winding RFA whereupon the action above related recurs.

As has been previously pointed out the shaft A is geared to shaft B and the shaft A' is geared to shaft B', there being a similar gearing ratio between these respective shafts. When an angular disagreement between shaft A and shaft A' occurs there is always a proportionate displacement between the shafts B and B'. A further provision in the subject invention is made whereby control of the motor MA is shifted to the error voltage produced in the winding RCA after the disagreement between shafts B and B' reaches a predetermined amount. This shift in control is arranged to become effective whenever the angular disagreement between shafts A and A' exceeds a value slightly less than 180 degrees. The control shift is effected principally by the action of the vacuum tubes V—1, V—2, V—3, and V—4.

As has been previously noted the vacuum tube V—4 is normally conducting so that the relay coil RL—1 is energized and the relay contacts RL—1a and RL—1b transferred so that the error voltage from winding RFA is fed via the transformer T—1 to the grids of tubes V—9 and V—10. Whenever there is any displacement or disagreement between shafts A and A' there is also a proportional disagreement between the shafts B and B' so that an error voltage is produced also in the winding RCA. Normally, the error voltage so produced is ineffective upon two parallel circuits which are capable of being energized from the winding RCA. These circuits are: (1) from winding RCA, line W—10, cathode of V—2, cathode of V—3, resistor R—4, anode of V—1, cathode of V—1, to winding RCA; and (2) from winding RCA, line W—10, resistor R—18 in parallel with primary P of transformer T—2, line W—18, resistor R—5, cathode of V—1, to winding RCA. However, when the error voltage induced in RCA reaches a predetermined value sufficient voltage drop is produced across the resistor R—4 to swing the grid of the tube V—3 negative, thereby cutting off its anode current and raising its anode potential. The grid of the tube V—2 via the potentiometer P—1 is given a positive potential thereby, and tube V—2 becomes conductive. The anode potential of tube V—2 therefore decreases and a negative potential is supplied to the grid of tube V—4 to render it non-conductive thereby deenergizing the relay RL—1. The relay contacts RL—1a and RL—1b consequently are restored to their normal positions so that error voltage from winding RCA is applied across the primary P of the transformer T—2 to induce voltage in the secondary S of transformer T—2, the induced voltage being applied to the grids of the tubes V—9 and V—10 for controlling the operation of the motor MA in a manner heretofore explained. Since an error voltage from winding RCA indicates ten times the disagreement between shafts A and A', that would be indicated by an equal error voltage from the winding RFA further provision is made by contact RL—1d to short out a resistor R—31 normally in the circuit of the series motor MA, resulting in the motor MA rotating at a higher speed. The contact RL—1d is closed when the relay RL—1 is deenergized by tube V—4.

The resistor R—18 is provided to be shunted across the primary P of transformer T—2 by relay contact RL—1c when the contacts RL—1a and RL—1b remove the secondary S of transformer T—2 from the grids of tubes V—9 and V—10 so that a relatively constant load is maintained across the winding RCA.

A legend of various circuit constants, components, and vacuum tube types used in the embodiment of the invention follows:

V—1: 7A6 R. C. A.
V—2, V—3, V—5, V—6: one half 6SL7 R. C. A.
V—7, V—8, V—9, V—10, V—11, V—12, V—13, V—14: one half 6SN7 R. C. A.
V—15: 6SJ7 R. C. A.
C—1, C—2, C—4: .1 mfd.
C—3: .05 mfd.
C—5: 200 mfd.
R—1: 40 ohms
R—2: 300,000 ohms
R—3, R—4, R—9, R—10, R—16, R—23, R—27, R—28, R—29: 100,000 ohms
R—5: 1000 ohms
R—6, R—7: 200,000 ohms
R—8, R—11: 50,000 ohms
R—12, R—13: 30,000 ohms
R—14: 200 ohms
R—15: 60,000 ohms
R—17, R—24, R—26: 150,000 ohms
R—18: 250 ohms
R—19: 12,000 ohms
R—20, R—22: 10,000 ohms
R—21, R—25: 1,000,000 ohms
R—30: 5000 ohms
P—1: 1,000,000 ohms Certain resistors and capacitors are shown in the legend and the drawing, their functions being those commonly associated with circuit connections of that sort in conventional circuits. For example, capacitor C—1 and capacitor C—4 act as delays for holding their associated relay coils RL—1 and RL—2 energized momentarily after the tubes V—4 and V—16 respectively become non-conducting. Capacitors C—2 and C—5 act as filter condensers. The resistor R—5 serves to distribute the load across the winding RCA between the two parallel circuits energized therefrom.

It is also to be noted that the potentiometer P—1 serves to adjust the input voltage to the grid of tube V—2 thereby controlling the tube V—4 and the relay RL—1 so that the control of the motor MA is shifted from the error voltage of winding RFA to the error voltage of winding RCA accordingly. Normally P—1 is adjusted so that this shift of control takes place when the disagreement between the shafts A and A' is slightly less than 180 degrees.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a motion reproducing device having a driving member and a driven member capable of being moved into coincidence with the said driving member by a motor, means for producing an electrical potential whenever the said driving member is non-coincident with the said driven member, the said potential being vectorially proportional to the non-coincidence between the said members, means responsive to the said potential for controlling the said motor to move the driven member toward coincidence with the driving member, and means responsive to the said potential for controlling the said motor to move the driven member continually in and out of coincidence with the said driving member.

2. In a motion reproducing device having a driving member and a driven member, the said driven member being moved into coincidence with the said driving member by a motor, means for producing an electrical potential whenever the said driving member is non-coincident with the said driven member, the said potential being vectorially proportional to the non-coincidence between the said members, a first means responsive to the said potential for controlling the rate of rotation of said motor to move the driven member at one predetermined speed toward coincidence with the driving member, a second means responsive to the said potential for controlling the direction of rotation of said motor to move the driven member into coincidence with the driving member, and means responsive to the said potential for continually controlling the said second potential responsive means when the driven member and the driving member approach coincidence.

3. In a motion reproducing device having a driving member and a driven member, a motor for continually moving the driven member into and beyond coincidence with the said driving member, means for producing an electrical potential whenever the said driving member is non-coincident with the said driven member, the said potential being vectorially proportional to the non-coincidence between the said members, a first means responsive to the said potential to move the said members at a predetermined speed toward coincidence when the degree of non-coincidence is greater than a predetermined amount, and a second means responsive to the said potential to move the said members at a lower predetermined speed into coincidence when the degree of non-coincidence is equal to or less than the said predetermined amount.

4. In a motion reproducing device having a driving member and a driven member, a motor for moving the driven member continually into coincidence with the said driving member, a first means for producing an electrical potential when the said members are non-coincident by a predeterminad amount, a second means for producing an electrical potential when the said members are non-coincident by a greater amount, each said potential being proportional in magnitude and direction to the non-coincidence of the said members, a first potential responsive means for controlling the said motor to move the driven member into coincidence with the driving member, and a second potential responsive means for selectively switching control of the said potential responsive means from the first said potential producing means to the second said potential producing means whenever the non-coincidence of the said members exceeds the said predetermined amount.

5. In a motion reproducing device having a driving member and a driven member, the said driven member being moved into coincidence with the said driving member by a motor, a first means for producing an electrical potential when the said members are non-coincident by a predetermined amount, a second means for producing an electrical potential when the said members are non-coincident by a greater amount, each said potential being proportional in magnitude and direction to the non-coincidence of the said members, a first potential responsive means for controlling the said motor to move the driven member into coincidence with the driving member, a second potential responsive means for selectively switching control of the said potential responsive means from the first said potential producing means to the second said potential producing means whenever the non-coincidence of the said members exceeds the said predetermined amount, and means for adjusting the second said potential responsive means for response to greater or lesser potentials than that produced when the said members are non-coincident by the said predetermined amount.

6. In combination a pair of geared together motion transmitting devices and a pair of similarly geared together motion receiving devices, a motor for continually moving the receiving devices into and beyond agreement with the said transmitting devices, electrical connections from corresponding transmitting devices to corresponding receiving devices, a source of alternating voltage for energizing the transmitting devices so that a positional disagreement therewith by the said receiving devices produces a differential potential in each of the pair of receiving devices, a motor operating circuit capable of being controlled by potential from one or the other of the said receiving devices to operate the said motor, and a selector circuit energized by potential from one of the said receiving devices for selecting one or the other of the said receiving devices to control the said operating circuit.

7. A motion reproducing device comprising a pair of transmitting transformers and a pair of receiving transformers, each of the said transformers including a rotor having a single circuit winding and a stator having a multicircuit winding, the said rotors of each pair being geared together in the same ratio, circuit means connecting the stators of the transmitting transformers with corresponding stators of the receiving transformers, a source of alternating voltage connected to the transmitting rotors for producing induced potentials in the receiving rotors upon angular disagreement therebetween, the said potentials being proportional to the said disagreement, an electric motor continually rotating the receiving rotors in a predetermined direction, a control circuit responsive to the potential of one of the receiving rotors for controlling the direction of rotation of the motor to bring the receiving rotors into agreement with the transmitting rotors, and a circuit for selectively connecting the said control circuit to one or the other of the said receiving rotors in accordance with the amount of disagreement between them and the transmitting rotors.

8. A motion reproducing device comprising a pair of transmitting transformers and a pair of receiving transformers, each of the said transformers including a rotor having a single circuit winding and a stator having a multicircuit winding, the said rotors of each pair being geared together in the same ratio, circuit means connecting the stators of the transmitting transformers with corresponding stators of the receiving transformers, a source of alternating voltage connected to the transmitting rotors for producing induced potentials in the receiving rotors upon angular disagreement therebetween, said potentials being proportional to the said disagreement, an electric motor continually and automatically rotating the receiving rotors in a preselected direction, a control circuit responsive to the potential of one of the receiving rotors for reversing or continuing the direction of rotation of the motor to bring the receiving rotors into agreement with the transmitting rotors, a circuit for selectively connecting the said control circuit to one or the other of the said receiving rotors in accordance with the amount of disagreement between them and the transmitting rotors, and means controlled by the selector circuit for increasing the speed of the said motor when the disagreement between the said transmitting rotors and receiving rotors exceeds a predetermined amount.

LEONARD R. HARPER.

REFERENCES CITED

The following references are of record in the file of this patent:

UNITED STATES PATENTS

| Number | Name | Date |
|---|---|---|
| 1,559,525 | Murphy et al. | Oct. 27, 1925 |
| 2,414,384 | Moseley | Jan. 14, 1947 |